United States Patent [19]

Tsuyama

[11] Patent Number: 5,114,384
[45] Date of Patent: May 19, 1992

[54] SILENT DRIVE CHAIN

[75] Inventor: Hideo Tsuyama, Wakayama, Japan

[73] Assignee: Tsubakimoto Chain Co., Osaka, Japan

[21] Appl. No.: 676,180

[22] Filed: Mar. 27, 1991

[30] Foreign Application Priority Data

Mar. 28, 1990 [JP] Japan .................................. 2-31017

[51] Int. Cl.⁵ .............................................. F16G 13/00
[52] U.S. Cl. ...................................... 474/212; 474/220
[58] Field of Search ........................ 474/206, 212–218,
474/220, 223, 229, 156, 157

[56] References Cited

U.S. PATENT DOCUMENTS 1,727,129  9/1929  Morse .............................. 474/220 X
4,345,904  8/1982  Numazawa et al. ............. 474/220 X Primary Examiner—Thuy M. Bui
Attorney, Agent, or Firm—Howson & Howson

[57] ABSTRACT

In a power transmission chain comprising multiple rows of link plates, leaf spring links, interposed between adjacent link plates, provide the chain with a degree of resistance to bending and thereby reduce vibration noise. The leaf spring links are provided with sprocket tooth-contacting surfaces which extend a short distance beyond the opposite sprocket tooth-contacting surfaces of the adjacent link plates. Consequently, the leaf spring links, perform two functions. They not only reduce vibration of the chain, but also cushion the impact of the sprocket teeth with the tooth-contacting surfaces of the link plates of the chain, thereby reducing impact noise. The leaf spring links can be arranged in two rows in overlapping, longitudinally offset relationship.

11 Claims, 3 Drawing Sheets

SILENT DRIVE CHAIN

BRIEF SUMMARY OF THE INVENTION

This invention relates to drive chains for mechanical power transmission, and in particular to a drive chain having improved noise-reduction features.

A typical power transmission chain used for transmitting mechanical power from one sprocket to another comprises a plurality of uniformly spaced transverse pins having multiple parallel, longitudinally-extending rows of link plates connected thereto. The link plates in adjacent rows are in longitudinally offset, overlapping relationship, so that any two adjacent link plates have only one common pin connecting them.

In the operation of power transmission chains, noise production has been a significant problem. One source of noise is the vibration of a run of the chain, i.e. the portion of chain extending from a point of tangency to one sprocket to a point of tangency to another sprocket. Another source of noise is the impact of the chain links against the sprocket teeth.

The problem of vibration noise has been successfully addressed by interposing resilient leaf spring links in compression between rows of link plates, as shown in U.S. Pat. No. 4,345,904, dated Aug. 24, 1982. These leaf spring links urge the link plates into frictional engagement with link plates in other rows in the chain. The frictional engagement imparts to the chain a resistance to bending, and prevents vibrations from being set up in the runs of the chain.

While the problem of vibration has been effectively eliminated by the use of interposed leaf spring links, the leaf spring links do not solve the problem of impact noise, generated when sprocket tooth-contacting surfaces of the chain engage the teeth of a driven sprocket, or when sprocket-tooth contacting surfaces of the chain are engaged by the teeth of a driving sprocket.

The principal object of this invention is to provide a simple and effective silent drive chain in which both vibration and impact noises are significantly reduced.

It is also an object of the invention to reduce impact noise in a drive chain in which leaf spring links are used to reduce vibration, without increasing the structural complexity of the chain.

A still further object of the invention is to provide a silent drive chain in which both vibration and impact noises are significantly reduced, and which is suitable for use in a narrow space.

The drive chain in accordance with the invention, comprises link plates in multiple parallel rows extending in the direction of the length of the chain and spring means pressing laterally against the link plates to reduce vibration of the chain. Each link plate has a first sprocket tooth-contacting surface facing in a first direction along the length of the chain. The spring means comprises a plurality of leaf spring links. Each leaf spring link is located alongside an adjacent link plate and also has a first sprocket tooth-contacting surface corresponding to the first sprocket tooth-contacting surface of the adjacent link plate. This surface also faces in the first direction, and is positioned to contact the same sprocket teeth which are contacted by the first sprocket tooth-contacting surface of the adjacent link plate. The first sprocket tooth-contacting surface of each leaf spring link extends in the first direction beyond the corresponding first sprocket tooth-contacting surface of its adjacent link plate. Consequently, the first sprocket tooth-contacting surface of the leaf spring link engages a sprocket tooth, and the leaf spring link is resiliently deformed, before the corresponding first sprocket tooth-contacting surface of its adjacent link plate engages the same sprocket tooth. The result of the engagement of the teeth of the resilient leaf spring links with the sprocket teeth is that the leaf spring links exercise a cushioning action, with a resulting remarkable reduction in impact noise.

In one preferred form of the chain, the leaf spring link extends beyond its corresponding link plate in both directions. That is, each link plate also has a second sprocket tooth-contacting surface facing in the opposite direction from said first direction, and each leaf spring link also has a second sprocket tooth-contacting surface corresponding to the second sprocket tooth-contacting surface of its adjacent link plate, this second surface also faces in said opposite direction. The second sprocket tooth-contacting surface of each leaf spring link extends, in said opposite direction, beyond the second sprocket tooth-contacting surface of its adjacent link plate. Consequently, in both directions of movement of the chain, and both in the driving of a sprocket by the chain and in the driving of the chain by a sprocket, a tooth-contacting surface of each leaf spring link engages a sprocket tooth, and the leaf spring link is resiliently deformed, before the corresponding tooth-contacting surface of the adjacent link plate engages the same sprocket tooth. With this arrangement impact noise is still further reduced.

In another preferred form of the chain, the link plates are divided into three sets held in spaced relationship by two rows of spring links. The spring links in the two rows are in overlapping, longitudinally offset relationship so that the noise reduction function of the resilient deformation of the spring links takes place at every sprocket tooth instead of only at every other sprocket tooth.

Further objects, advantages and details of the invention will be apparent from the following detailed description, when read in conjunction with the drawings.

DETAILED DESCRIPTION

Figure 3:
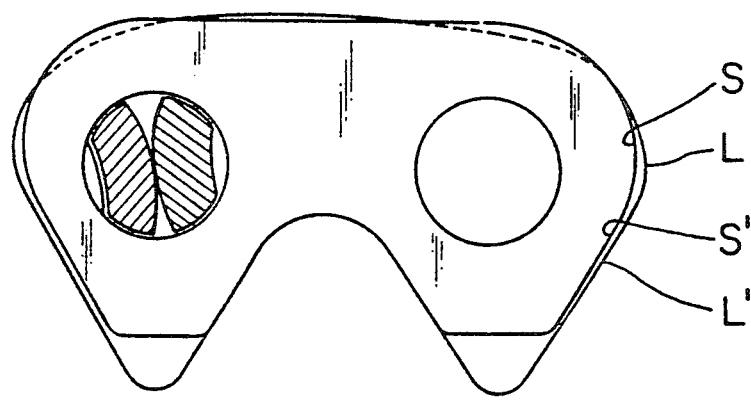
FIG. 3 is an elevational view of a typical link plate and leaf spring link in accordance with the prior art.

Referring first to FIG. 3, the transmission chain of U.S. Pat. No. 4,345,904 utilizes multiple layers of link plates, one of which is indicated by reference L. Adjacent to link plate L, there is provided a leaf spring link S, which has transverse holes aligned with the transverse holes in link plate L. The leaf spring link is held in compression between link plate L and adjacent link plates (not shown), and serves to hold link plates in frictional contact with one another. This frictional contact imparts to the chain a degree of resistance to bending, and thereby reduces the tendency of the chain to vibrate.

The sprocket tooth-contacting surface L' of link plate L projects beyond edge S' of the leaf spring link so that edge S' never contacts the sprocket teeth. The opposite edge of the leaf spring link is similarly related to the opposite sprocket tooth-contacting surface of the link plate, and likewise never contacts the sprocket teeth. In operation of the chain of FIG. 3, a sprocket tooth is engaged directly and simultaneously by the tooth-contacting surfaces L' of several link plates. There is no dispersion of impact noises which result from such contact, and consequently, even though vibration noise is reduced or eliminated, impact noise persists.

In accordance with the present invention, the leaf spring link is provided with sprocket tooth-contacting surfaces which extend a short distance beyond the opposite sprocket tooth-contacting surfaces of the adjacent link plate. Therefore, the leaf spring links, perform two functions. They not only reduce vibration of the chain, but also cushion the impact of the sprocket teeth with the tooth-contacting surfaces of the link plates of the chain, thereby reducing impact noise.

Figure 1:
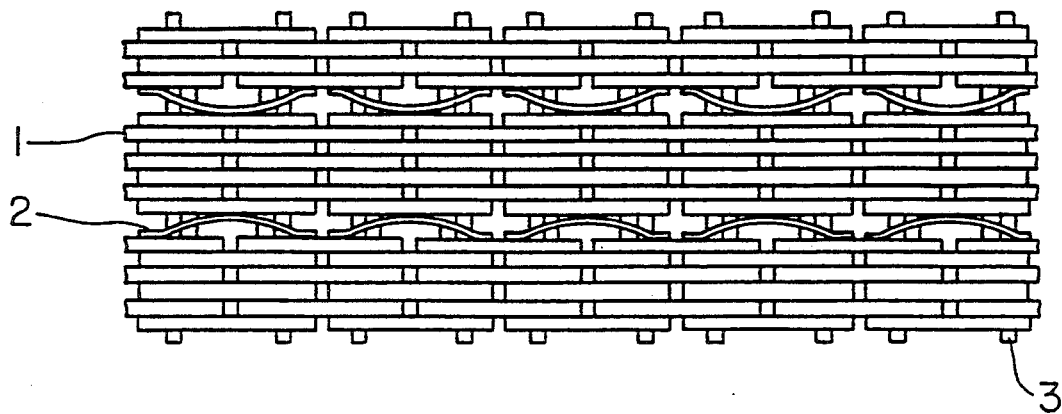
FIG. 1 is a plan view of a typical silent chain in accordance with the invention, having a large number of rows of link plates and two rows of leaf spring links.

As shown in FIG. 1, the power transmission chain according to the invention typically comprises multiple layers of link plates interconnected by transverse pins 3, with the link plates in each layer being longitudinally offset from, and in overlapping relationship with, the link plates in each adjacent layer. While each link plate has two transverse pins extending through it, any adjacent pair of overlapping, longitudinally offset links, has only one common transverse pin. The pins may be any of several kinds, including conventional round pins, and locker joint pins.

In FIG. 1, there are shown two rows of leaf spring links 2. The leaf spring links are held in compression between adjacent rows of link plates. A mid point of each spring link is in contact with a mid point of one side face of an adjacent link plate sharing the same two transverse pins, and is bent so that its ends are in contact respectively with side faces of two successive link plates in the adjacent row of link plates. The leaf spring links hold the layers of link plates against one another, as shown in FIG. 1, to reduce chain vibration.

Figure 2:
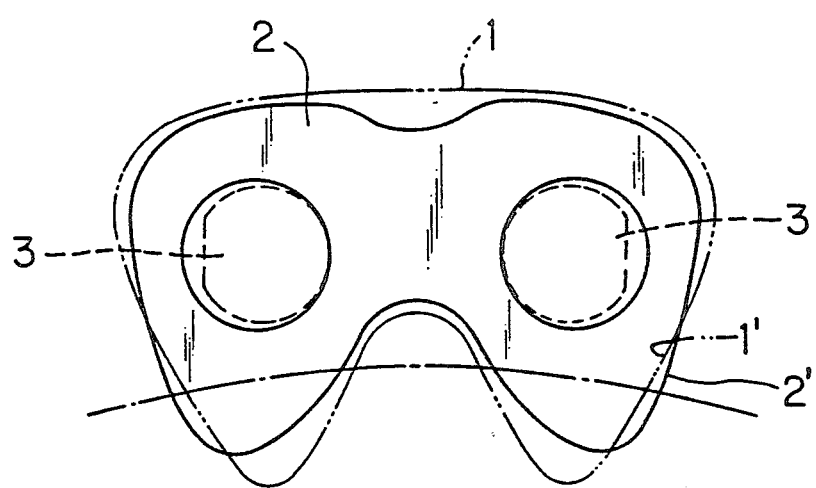
FIG. 2 is an enlarged front elevational view of a link plate and an adjacent leaf spring link in a chain constructed in accordance with the invention.

As shown in FIG. 2, and edge of leaf spring link 2 forms a sprocket tooth-contacting surface 2', which, at the pitch circle, projects in one direction along the length of the chain, beyond sprocket tooth-contacting surface 1' of link plate 1. The opposite edges of link plate 1 and leaf spring link 2 are similarly configured so that the opposite edge of the leaf spring link projects beyond the adjacent sprocket tooth-contacting surface of the link plate in the opposite direction. The link plate and leaf spring link are both preferably symmetrical, and both are preferably symmetrically related to each other.

In operation of the chain in a power transmission having two or more sprockets, the leaf spring links contact the sprocket teeth and are resiliently deformed before the adjacent link plates contact the same sprocket teeth. The cushioning action of the leaf spring links moderates the impact of the link plates against the sprocket teeth, and the result is a remarkable reduction in impact noise.

The cushioning action of the leaf spring link does not diminish the vibration-reducing function of the leaf spring links. Consequently the leaf spring links in accordance with the invention are highly effective in reducing both vibration noise and impact noise.

Figure 4:
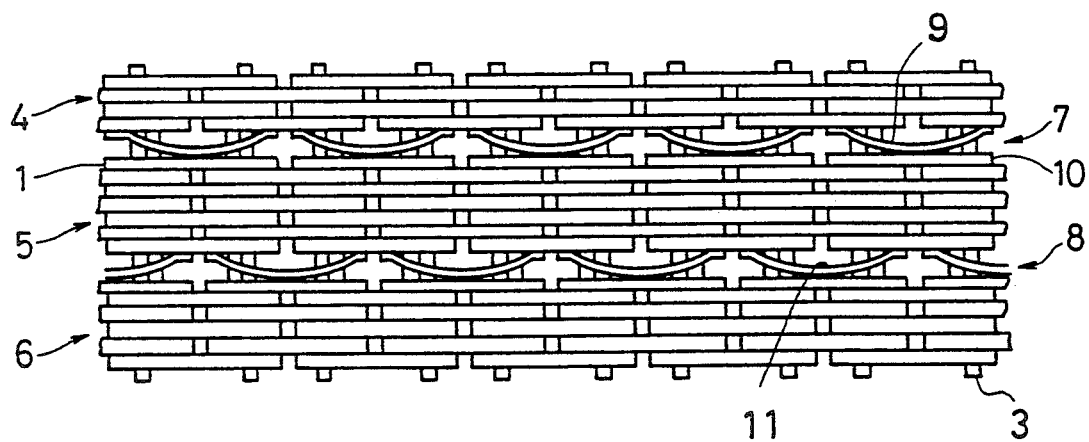
FIG. 4 is a plan view of a second embodiment of the silent chain, in which the leaf spring links in the two rows are in overlapping, longitudinally offset relationship.

Turning now to FIG. 4, the embodiment shown comprises three sets of link plates, the sets being numbered 4, 5 and 6. Each set comprises at least one row of link plates 1, and preferably several rows as shown. The link plates of adjacent rows are preferably in longitudinally offset, overlapping relationship, and are interconnected by transverse pins 3, which are arranged at a uniform pitch along the length of the chain. Each link plate is held on two adjacent pins.

Link plate sets 4 and 5 are separated by a row 7 of leaf spring links, and link plate sets 5 and 6 are similarly separated by a row 8 of leaf spring links. These leaf spring links urge the sets of link plates apart, and at the same time laterally compress the link plates in each set so that they are in frictional engagement with one another.

Each spring link is located adjacent to a link plate on a common set of pins 3. For example, spring link 9 is adjacent to link plate 10 on a common set of pins. Each spring link has sprocket tooth-contacting surfaces which extend in both directions beyond the sprocket tooth-contacting surfaces of its adjacent link plate to produce the impact noise reducing effect described with reference to FIGS. 1 and 2.

The chain of FIG. 4 differs from the chain of FIG. 1 in that, in FIG. 4, the spring links of the two rows 7 and 8 are in longitudinally offset, overlapping relationship, so that spring link 9, for example is held by first and second transverse pins, while spring link 11 is held by the second transverse pin and a third transverse pin. With the leaf spring links in the respective rows in longitudinally offset, overlapping relationship, as shown, the impact noise reduction effect occurs at every sprocket tooth, rather than at every other sprocket tooth, as is the case with the chain of FIG. 1.

While each of the three sets of link plates in the chains of FIGS. 1 and 4 is shown as comprising several rows of link plates, each set can consist of a single row, in which case the link plates of the intermediate set should be longitudinally offset relative to the link plates of the outer sets.

A number of other modifications can be made to the chains described herein. For example, while the chain shown in FIGS. 1 has two rows of leaf spring links, a single row of leaf spring links, or more than two rows, can be used. In an alternative embodiment, the leaf spring links can be laterally staggered rather than arranged in rows. Various other modifications can be made to the silent chain described herein without departing from the scope of the invention as defined in the following claims.

I claim:

1. A silent chain for transmitting power through a sprocket wheel, said chain comprising layers of series-connected ink plates, each link plate having a surface for interengaging a sprocket wheel tooth, and leaf spring links held in compression between said layers, each leaf spring link being located alongside of at least one adjacent link plate with spring surface projected beyond said plate surface for resiliently interengaging the tooth before said plate surface interengages the same tooth.

2. A silent drive chain for transmitting power through a sprocket wheel, said chain comprising link plates in multiple parallel rows extending in the direction of the length of the chain and spring means pressing laterally against said link plates to reduce vibration of the chain, in which:

each link plate has a first plate surface facing in a first direction along the length of the chain for contacting a sprocket wheel tooth;

the spring means comprises a plurality of leaf spring links;

each leaf spring link is located alongside at least one adjacent link plate and also has a first spring surface corresponding to the first plate surface of said adjacent link plate, said spring surface also facing in said first direction and positioned to contact the same tooth contacted by the first plate surface of said adjacent link plate; and the first spring surface of each leaf spring link extends in said first direction beyond the corresponding first plate surface of its adjacent link plate;

whereby, the first spring surface of the leaf spring link engages the tooth, and the leaf spring link is resiliently deformed, before the corresponding first plate surface of its adjacent link plate engages the same sprocket tooth, and impact noise is thereby reduced.

3. A silent drive chain according to claim 2 in which each link plate also has a second plate surface facing in the opposite direction from said first direction for contacting said tooth; each leaf spring link also has a second spring surface corresponding to the second plate surface of its adjacent link plate, said second spring surface also facing in said opposite direction; and the second spring surface of each leaf spring link extends, in said opposite direction, beyond the second plate surface of its adjacent link plate; whereby, in both directions of movement of the chain, and both in the driving of the sprocket wheel by the chain and in the driving of the chain by the sprocket wheel, a spring surface of each leaf spring link engages a sprocket tooth, and the leaf spring link is resiliently deformed, before the corresponding plate surface of the adjacent link plate engages the same sprocket tooth.

4. A silent drive chain according to claim 2 in which at least one of said parallel rows of link plates is located immediately adjacent to, and in contact with another one of said parallel rows of link plates, and in which the link plates in the respective contacting rows are held in frictional engagement with one another by said spring means.

5. A silent drive chain according to claim 2 in which said leaf spring links are arranged in a row extending in said direction of the length of the chain.

6. A silent drive chain according to claim 2 having a plurality of uniformly spaced transverse pins interconnecting said link plates, and in which the link plates of one of said multiple parallel rows are in longitudinally offset, overlapping relationship with the link plates of a next adjacent one of said parallel rows, each link plate has two of said pins extending through it, and the link plates of each pair of overlapping link plates in said one of said rows and said next adjacent one of said rows have only one common pin extending through them, and in which each leaf spring link has two of said pins extending through it and has an intermediate portion bearing against an intermediate portion of a link plate having the same two pins extending through it.

7. A silent drive chain according to claim 2 having first, second and third sets of link plates, each set comprising at least one row of link plates extending in the direction of the length of the chain, in which said first set is laterally spaced from said second set, and said second set is laterally spaced from said third set, a plurality of transverse pins interconnecting said link plates, a first row of leaf spring links extending in the direction of the length of the chain, the leaf spring links of the first row being located between said first and second sets of link plates, and urging the link plates of said first set laterally away from the link plates of said second set, a second row of leaf spring links extending in the direction of the length of the chain, the leaf spring links of the second row being located between said second and third sets of lock plates, and urging the link plates of said second set laterally away from the link plates of said third set, in which the link plates of at least one row of link plates in one of said sets are in overlapping, longitudinally offset relationship with the link plates of at least one row of link plates in another one of said sets, and in which the leaf spring links of the first row of leaf spring links are in overlapping, longitudinally offset relationship with the leaf spring links of the second row of leaf spring links, in which each leaf spring link is located alongside a link plate, in which each leaf spring link and a link plate alongside it have respective corresponding spring and plate surfaces both facing in a first direction along the length of the chain and positioned to contact the same sprocket teeth, with the spring surface of the leaf spring link extending in said first direction beyond the corresponding plate surface of the link plate alongside it, whereby the spring surfaces of the leaf spring links engage the sprocket teeth and the leaf spring links are resiliently deformed before the corresponding plate surfaces of the link plates alongside them engage the same sprocket teeth.

8. A silent drive chain according to claim 7 in which, for every three successive transverse pins of said plurality of transverse pins, a first and a second pin of said three pins extend through openings in a leaf spring link in said first row of leaf spring links, and said second pin and a third pin extend through openings in a leaf spring link in said second row of leaf spring links.

9. A silent drive chain according to claim 7 in which each leaf spring link and a link plate alongside it have respective corresponding second spring and plate surfaces both facing in a second direction opposite to said first direction along the length of the chain and positioned to contact the same sprocket teeth, with the second spring surface of the leaf spring link extending in said second direction beyond the corresponding second plate surface of the link plate alongside it, whereby the second spring surfaces of the leaf spring links engage the sprocket teeth and the leaf spring links are resiliently deformed before the corresponding second plate surfaces of the link plates alongside them engage the same sprocket teeth.

10. A silent drive chain for transmitting power through a sprocket wheel, said chain comprising;

a plurality of uniformly spaced transverse pins having at least two parallel rows of link plates connected thereto;

in which the link plates of a first one of said rows are in longitudinally offset, overlapping relationship with the link plates of a second one of said rows, each link plate has two of said pins extending through it, and the link plates of each pair of overlapping link plates in said first row and said second row have only one common pin extending through them;

and further comprising spring means for urging the link plates of said first and second rows away from each other, the spring means comprising leaf spring links, each leaf spring link being disposed immediately adjacent to a link plate in the first one of said rows and having the same two pins extending through it as extend through the immediately adjacent link plate in said first one of said rows;

wherein said leaf spring link has at least one spring surface facing in a first direction along the length of the chain for contacting a tooth of the sprocket wheel, and the immediately adjacent link plate of the first row has a corresponding plate surface positioned to contact the same sprocket tooth contacted by the spring surface of the immediately adjacent leaf spring link; and wherein the spring surface of each leaf spring link extends longitudinally beyond the plate surface of the immediately adjacent link plate;

whereby the spring surface of the leaf spring link engages a sprocket tooth, and the leaf spring link is resiliently deformed, before the corresponding plate surface of its adjacent link plate engages the same sprocket tooth, and impact noise is thereby reduced.

11. A silent drive chain according to claim 10 in which said leaf spring link has a second spring surface facing in the opposite direction from said first direction, and the immediately adjacent link plate of the first row has a corresponding second plate surface positioned to contact the same sprocket teeth as are contacted by the second spring surface of the immediately adjacent leaf spring link; and wherein the second spring surface of each leaf spring link extends longitudinally beyond the plate surface of the immediately adjacent link plate.

* * * * *